United States Patent [19]

Close et al.

[11] 4,073,318
[45] Feb. 14, 1978

[54] PROCESS FOR WEAR-RESISTANT DUCTS

[75] Inventors: James R. Close, Roberts, Wis.; James R. Johnson, White Bear Lake, Minn.

[73] Assignee: Minnesota Mining and Manufacturing Company, St. Paul, Minn.

[21] Appl. No.: 743,337

[22] Filed: Nov. 19, 1976

[51] Int. Cl.² ............................................. F16L 9/14
[52] U.S. Cl. .................................... 138/149; 156/83; 156/294; 29/455 R; 428/36; 428/324; 428/454; 428/913
[58] Field of Search ................. 428/36, 33, 49, 98, 428/44, 45, 324, 331, 454, 913; 156/155, 165, 71, 294, 83, 74, 77, 78; 29/447, 455, 446; 264/262; 138/149

[56] References Cited

U.S. PATENT DOCUMENTS

| 2,824,033 | 2/1958 | Donaldson | 156/74 |
| 3,044,499 | 7/1962 | Frerich | 138/149 |
| 3,460,305 | 8/1969 | Long | 428/44 |
| 3,488,040 | 1/1970 | Dickson | 138/149 |
| 3,886,024 | 5/1975 | Chase | 156/294 |
| 3,916,057 | 10/1975 | Hatch et al. | 428/236 |

Primary Examiner—William R. Dixon, Jr.
Attorney, Agent, or Firm—Cruzan Alexander; Donald M. Sell; Temple Clayton

[57] ABSTRACT

A process is provided for applying refractory wear-resistant interlocking tile to the inner surface of a circular to elliptical tubular casing and securing them in position by exertion of centripetal force from intumescence of an insulative sheet material between the tile and the casing exerting substantially uniform centrifugal and centripetal forces.

4 Claims, 7 Drawing Figures

U.S. Patent  Feb. 14, 1978  4,073,318
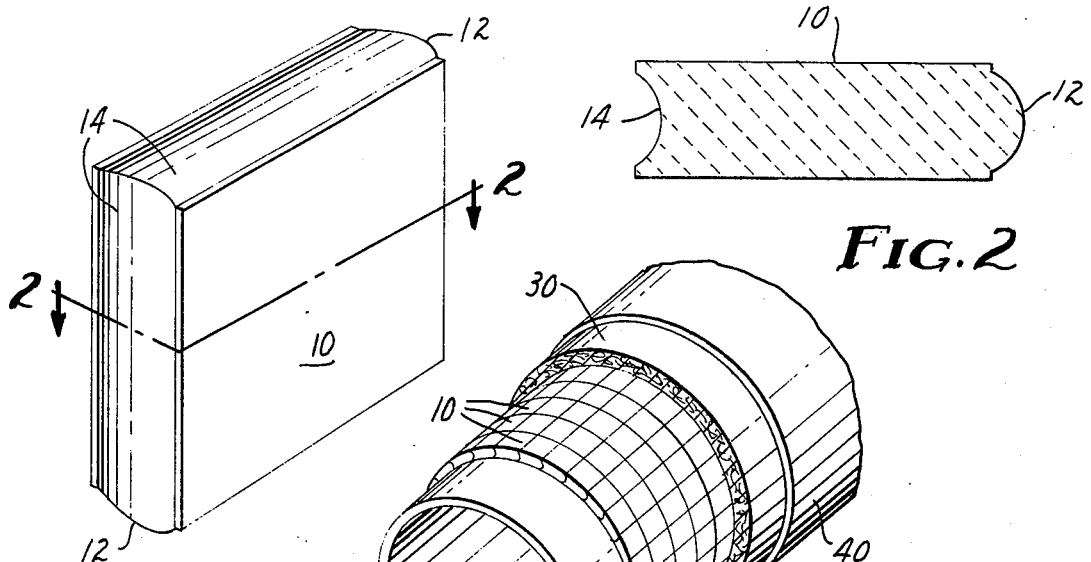
FIG.1
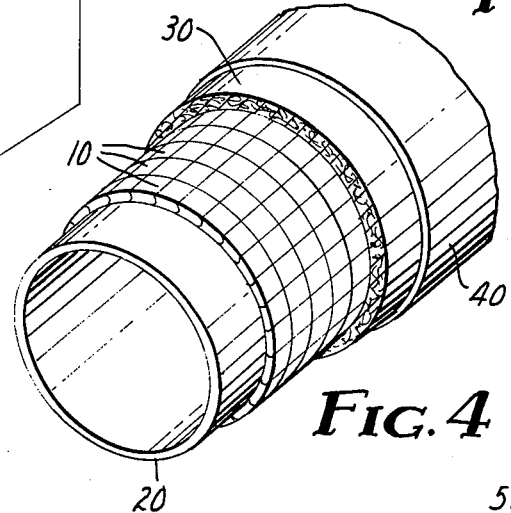
FIG.2
FIG.4
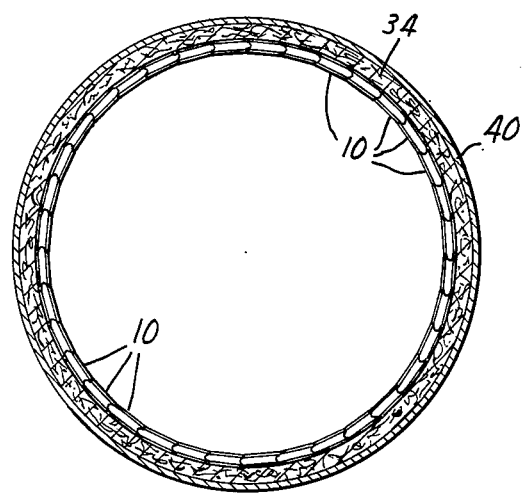
FIG.5
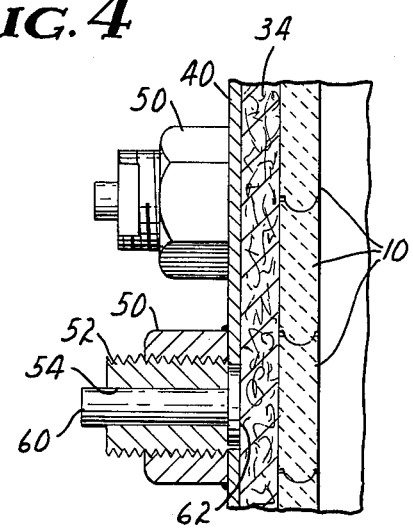
FIG.7
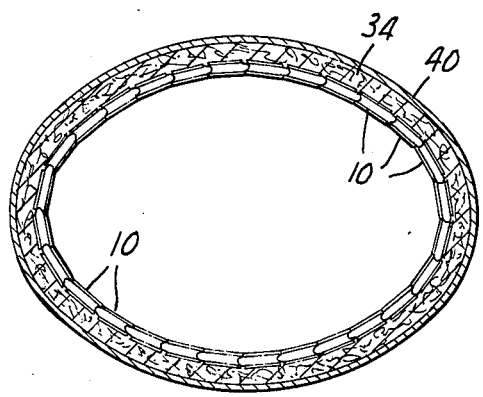
FIG.6
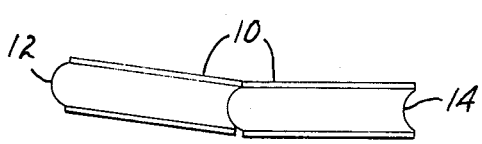
FIG.3

PROCESS FOR WEAR-RESISTANT DUCTS

This invention relates to wear-resistant linings for tubes, such as pipes of relatively large diameter and of circular or somewhat elliptical cross-section. This invention further relates to tubes or pipes lined by the process of the invention.

Ducts which are used for transport of materials, which contain greater or less amounts of abrasive material and corrosive gases are subject to severe erosion over periods of time and tend to deteriorate rapidly. This requires replacement and possible suspension of operations for greater or less times for replacement or repair. There is also the problem of having sufficient resistance to oxidative or reductive conditions at elevated temperatures and ultimately even fusion of the material of the tube or pipe at even higher temperatures. Furthermore, although tubes can be made of refractory materials with some difficulty, monolithic ceramic pieces tend to be somewhat brittle and possibly susceptible to deterioration as a result of repeated thermal cycles. Thus there is a need for abrasion-resistant, refractory duct-work which is little affected by thermal cycling.

It is an aim and object of this invention to provide ductwork which is resistant to abrasion by transported materials, refractory at elevated temperatures and substantially unaffected by repeated thermal cycling. Other objects and aims will become evident herein elsewhere.

In accordance with these and other aims and objects of the invention it has been found that interlocking abrasion-resistant refractory tile can be secured in tubes and pipes by application of centripetal pressure from the expansion of insulative sheet materials expandable to resilient mat means which materials, on expansion, simultaneously exert centrifugal pressure against the inner surface of the tubes or pipes. Particularly preferred are intumescent materials such as vermiculite which may be considered exemplary herein of other useful materials as well as being a preferred material. The expanded intumescent materials maintain pressures and are resilient over extended periods of time under thermal cycling and mechanical attrition. Ducts produced in this manner are especially adapted to combinations of gaseous or vaporous materials containing suspended abrasive particles. The linings of abrasion-resistant tile and intumescent material further provide insulation against elevated internal temperatures. The tile form a lining mosaic of excellent abrasion resistance as well as providing resistance to corrosive gases and hermetic sealing of the space between tile and casing. It will be recognized that alternative equivalents exist for the intumescent sheet material used particularly herein. This intumescent composition can be sprayed on the tile temporarily attached to a mandrel or individual tile having intumescent backing can be adhered to the inner surface of the duct. Other equivalents will also become evident.

The invention is understood in part by reference to the drawings herewith wherein FIG. 1 is an individual tile;

FIG. 2 is a section of FIG. 1 along line 2—2;

FIG. 3 shows two interlocking tile;

FIG. 4 shows diagrammatically one embodiment of the process of the invention for inserting interlocking tile and intumescent material in a tube;

FIG. 5 shows a tube or duct of circular cross-section lined with interlocking tile and an expanded intumescent sheet;

FIG. 6 is like FIG. 5 for a tube or duct of elliptical cross-section;

FIG. 7 shows a partial section of a tube or duct of FIG. 5 provided with means for measuring centrifugal force exerted by the expanded intumescent sheet.

In these drawings in which the same indicia are used for the same features, tile 10 with convex edges 12 and mating concave edges 14 is shown in one embodiment of the process of the invention applied to the surface of a mandrel 20 suitably of cardboard or other flammable or evanescent material. The application may be effected by coating one surface of each tile or, alternatively, the surface of the mandrel with adhesive and placing the tile in longitudinal and circumferential interlocking relationship. One or more sheets of intumescent sheet material 30 is then applied around the tile and maintained in position while the assembly is inserted in tube 40. The assembly is then heated to destroy mandrel 20 and to expand the intumescent sheet 30 to intumescent filler 34 which exerts centripetal pressure to tile 10 and centrifugal pressure on tube 40 and thereby retains tile 10 securely within tube 40. The same procedure is used to produce the duct as shown in FIG. 5 with circular cross-section or with elliptical or oval cross-section as shown in FIG. 6.

The tile which are used are conveniently of the structure shown in FIG. 1 with two convex and two mating concave sides. In some instances it is contemplated that only one pair of opposite edges will be concave and convex respectively and that these will be placed around the circumference of the duct. Tile of other interlocking structures can be used also although they cannot be too rigidly interlocking because some freedom of movement is desirable. The preferred tile have male convex edges of tongues and female concave edges or grooves with radii of curvature of about one half the thickness of the tile with centers of curvature displaced so that the tongue is about one third the thickness of the tile in height and the groove about one-fifth the thickness of tile in depth and each is bordered by flat ledges or shoulders.

Alumina of 85% or greater purity is particularly preferred as material because of its combination of relatively high melting point and great hardness and hence resistance to wear and abrasion. Other compositions such as cordierite, mullite, silicon carbide, silicon nitride, etc. can be used in many applications.

Dimensions can be varied over considerable ranges depending on the particular application. In general individual tile for lining a tube of circular cross-section using the process of the invention should cover an angle (chord) of at least 8° and up to 30° as measured from the center of curvature. There will thus be from 12 to 45 tile in the circumference. Similar criteria can be used for lining elliptical or oval tubes and it is contemplated that tile of different dimensions can be used together in such situations. Although the tile is shown as flat and essentially square, it will be understood that rectangular shapes generally are useful. Furthermore, it is within the scope of the invention to employ a tile which has a curvature of radius about equal that of the tube to be lined. Generally one convex edge of each tile will face upstream, i.e., toward the source of flow.

Although as shown in the drawings the tile may be considered as individually placed on the mandrel it is also contemplated to apply tapes of suitably spaced tile in a helix around the mandrel so that tile are aligned longitudinally but offset slightly in the circumference to overlap two tile in each adjacent longitudinal row. A similar result can be achieved by stringing tile having holes from concave to convex side on wire or cord and wrapping the strung tile around the mandrel. Other methods will be evident to those of skill in the art.

The intumescent material employed is a sheet material and preferably sheet materials described and claimed in Hatch et al. U.S. Pat. No. 3,916,057 which are free from organic materials. Other intumescent sheet materials including those comprising organic substances can be used. Because the decomposition of organic material must occur in the confined space between tile and tube, materials comprising organic substances are somewhat less satisfactory.

It is desirable that after expansion the intumescent sheet material exert a force on the tile, i.e. centripetally of at least 2 and up to about 35 Newtons per cm$^2$ so that centripetal forces between these extremes are needed to force the tile into circumferential interlocking relationship. These forces are determined using a conventional Instron Tester. The centripetal force is measured by measuring the force necessary to force a single tile toward the casing for a distance of 0.75 mm. Because of the interlocking of tile the measured force on a given tile is estimated to be approximately 150% of the actual centripetal force exerted on that tile.

The centrifugal force can be measured in a specially built tube similar to the one of FIG. 5 but with a series of plungers built into the casing as shown in FIG. 7. It will be seen that the two shown are staggered so that only one is shown in section. Each device consists essentially of a large hexagonal nut 50 welded to casing 40 with plug 52 having central hole 54 in which is loosely fitted plunger 60 with foot 62 fitting into a hole in casing 40. The several devices are assembled before refractory tile 10 are inserted so that the surface of foot 62 is substantially flush with the inner surface of casing 40 and rests against the face of plug 52. The expanded intumescent mat 34 exerts centrifugal pressure against plunger feet 62 and casing 40. The force necessary to move plunger 62 against mat 34 for a distance of 0.75 mm is measured as the centrifugal force.

Intumescent sheet materials are usually made in thicknesses of about 0.5 to 5 mm and, of course, two or more layers may be employed if the space to be filled is rather large. In general the thicknesses of unexpanded intumescent sheet material will be greater than one half the space to be filled but may be more or less depending on the thickness and pressures attained by expansion of a sample piece.

The tubes employed may be of any useful material but will usually be metal such as steel. In general it will be excessively difficult to line a cylindrical tube or pipe of a diameter less than about 5 cm and preferably the minimum diameter should be at least 10 cm. and upwards to 100 cm. and more. Larger tubes can be lined by the process of the invention, if desired, noting that larger tile may be needed to remain within the chord angles noted. In the case of elliptical or oval cross-sections the ratio of minor to major axis will usually not be less than about 0.3 as it is more difficult to achieve conditions of uniform centripetal force when there are wide variations in radii of curvature between parts of the ellipse. Uniform expansion of intumescent mat may be more difficult with very large pieces.

An especially convenient embodiment of the process of the invention employs a mandrel of slightly larger diameter than the expected diameter of the tile lining. The mandrel is composed of a volatile or combustible composition such as cardboard or synthetic plastic and tile are mounted on the surface as shown diagrammatically in FIG. 4 followed by the necessary layers of intumescent sheet material and the assembly is placed in the desired casing or tube and heated therein to expand the intumescent material and destroy the mandrel. The resultant structure can be used as a duct or for other purposes. It may form the core of a concentric tube arrangement in which the intermediate space is pressurized.

An alternative procedure is to form a partial assembly by laying the tile in a semicircular or semielliptical trough of proper radius of curvature or shape and cementing the tile together by applying beads of a suitable volatile or decomposable adhesive or cement along at least some lines or points of contact followed by letting the cement harden. Two such semicircular forms are placed together, wrapped with intumescent sheet material and inserted in the selected tube.

Other methods for carrying out the process of the invention will occur to those of skill in the art.

The following examples illustrate the process and products of the invention.

Alumina tile as shown in FIG. 1 approximately 15.5 mm on a side are formed by firing alumina bodies in conventional procedures. The tile are mounted in mild steel tubing (e.g., stovepipe) about 13.5 cm long by 12.5 cm in internal diameter having 0.09 cm wall thickness as follows:

A circular cylindrical self-supporting mandrel of light cardboard about 13.5 cm long and 10.7 cm in diameter is covered on the exterior with double-coated pressure sensitive adhesive tapes and tiles are adhered to the mandrel. Twenty-two interlocking tiles encircle the circumference of the mandrel in a row to give an exterior diameter of 11.68 cm. Nine such rows of interlocking tiles are assembled to complete the cylinder; so that the individual tile are arranged in longitudinal rows. The cylinder is inserted into a stove pipe as described above. The average gap between the tiled cylinder and the pipe is 0.42 cm. Intumescent sheet material, as described in U.S. Pat. No. 3,916,057 and about 0.36 cm thick, is inserted in the gap as a mat. Conveniently this mat is carefully wrapped around the tile cylindrical mandrel and the resulting assembly inserted into the pipe.

The entire assembled unit is placed in a furnace (suitably electrically heated) and heated to 650° C to expand the intumescent mat. The expansion of the mat exerts an inward i.e. centripetal, force on the interlocking tiles and an outward, i.e. centrifugal, force against the pipe thereby securely holding the tile in place. During the heating at 650° C, the cardboard mandrel and the tape are thermally decomposed leaving the tiles exposed. The integrity of the mounting is determined by the following test. A 2270 gm hammer on a 43.2 cm radius pivot arm is mounted so that it can swing in an arc and strike the side of the tile lined pipe. The force exerted by the expanded intumescent sheet material is proportional to the thickness of the mat for a given composition. Mats of 0.234 cm, 0.269 cm and 0.363 cm are prepared according to the description given in U.S. Pat. No. 3,916,057 and ducts lined with tile are prepared as above using the three thicknesses of intumescent sheet material. The force exerted on the tiles is predetermined to be about 2, 4 and 8 Newtons per cm² respectively. Impact test are run by varying the vertical height to which the hammer is raised and allowed to swing through its natural arc. The results of such tests are tabulated below:

Table I

| | Intumescent Mat | | | |
|---|---|---|---|---|
| Sample | Thickness (cm.) | Pressure (Newtons/cm²) | Drop Height (cm.) | Results |
| 1 | 0.234 | 2.1 | 14 | Tile loosens |
| | | | 17 | Tiles drop out |
| 2 | 0.269 | 4.1 | 31 | Tile loosens |
| | | | 41 | Pipe deforms |
| 3 | 0.363 | 8.3 | 38 | No effect |
| | | | 41 | Pipe deformed |

Thus, it is established that interlocking tiles held in place by an intumescent mat expanded to yield a pressure of at least about 2 Newtons per square centimeter or more having useful integrity.

Several tests are conducted by the procedure described hereinabove for determining centrifugal and centripetal forces developed in the process of the invention using the tile described above in a steel casing about 12.5 cm in diameter fitted with five of the test plungers as shown in FIG. 7 the foot of each being 0.71 cm². Twenty-two rows of tile are required and a gap of about 4.0 mm is formed between the tile and casing. Intumescent sheets of various uncalendered and calendered or compressed thickness are used so that various ranges of pressures are developed. The test pieces are prepared and fired as described above and forces measured on an Instron Tester as set forth above. The data are tabulated in Table II.

What is claimed is:

1. As an article of manufacture a duct consisting essentially of casing, interlocked abrasion-resistant tile lining and expanded intumescent composition between said tile lining and said casing exerting forces thereon respectively centripetally and centrifugally of said tile lining in said casing of at least 2 Newtons per cm².

2. A process for providing abrasion resistance to the inner surface of a hollow tube of round to elliptic cross-section comprising
   A. Providing said tube internally with a first layer of insulative sheet material expandable to resilient mat means and a second layer of interlocking refractory abrasion resistant tile temporarily positioned inward of said first layer, clearances between said tube and said first and second layers being sufficiently large to permit relative movement between said tube and said second layer and not being greater than the expanded thickness of said insulative sheet material, and
   B. Heating said tube under conditions of substantially uniform circumferential heat distribution with said first and second layers in position whereby expansion of said insulative sheet material is effected substantially uniformly so that force is exerted centripetally of said tube on said interlocking tile and centrifugally on said tube of at least 2 Newtons per cm² and sufficient to hold said tile in securely interlocked relationship within said tube.

3. The process according to claim 1 wherein at least said second layer is applied externally to a mandrel of evanescent composition and the assembly is inserted into the tube.

4. The process according to claim 1 wherein the intumescent sheet material comprises vermiculite.

* * * * *

Table II

| Run | 1 | 2 | 3[b] | 4 | 5 | 6 |
|---|---|---|---|---|---|---|
| Thickness of Intumescent sheet (mm) | | | | | | |
| Uncalendered | 2.84 | 3.43 | 3.99 | 2.67[e] | 3.63 | 4.09 |
| Calendered | 1.91 | 3.30[a] | 3.56 | | 2.74 | 3.40 |
| Free expansion % | — | 80 | 96 | 100 | 155 | 161 |
| Weight of 555 cm² piece in g. | 80.7 | 90.6 | 122.9 | 80 | 104.5 | 127.5 |
| Bulk density after expansion g/cm³ | 0.36 | 0.41 | 0.55 | 0.36 | 0.47 | 0.57 |
| Centrifugal force[c] newtons/cm² | 15.8 | 30.0 | 22.5 | 16.5 | 34.7 | 48.1 |
| Centripetal force[d] newtons/cm² | 5.2 | 25.8 | 12.5 | 9.7 | 32.1 | 32.1 |
| Ratio of centrifugal to centripetal force | 3.04 | 1.16 | 1.80 | 1.70 | 1.08 | 1.49 |

[a]Compacted with roller than calendred.
[b]Aqueous treatment after placement of tile and sheet material before expansion. One plunger stuck.
[c]Average of five measurements except Run 4.
[d]Average of five measurements, assuming moving of tile affects 6.5 cm².
[e]Not calendered.